Figure 1:
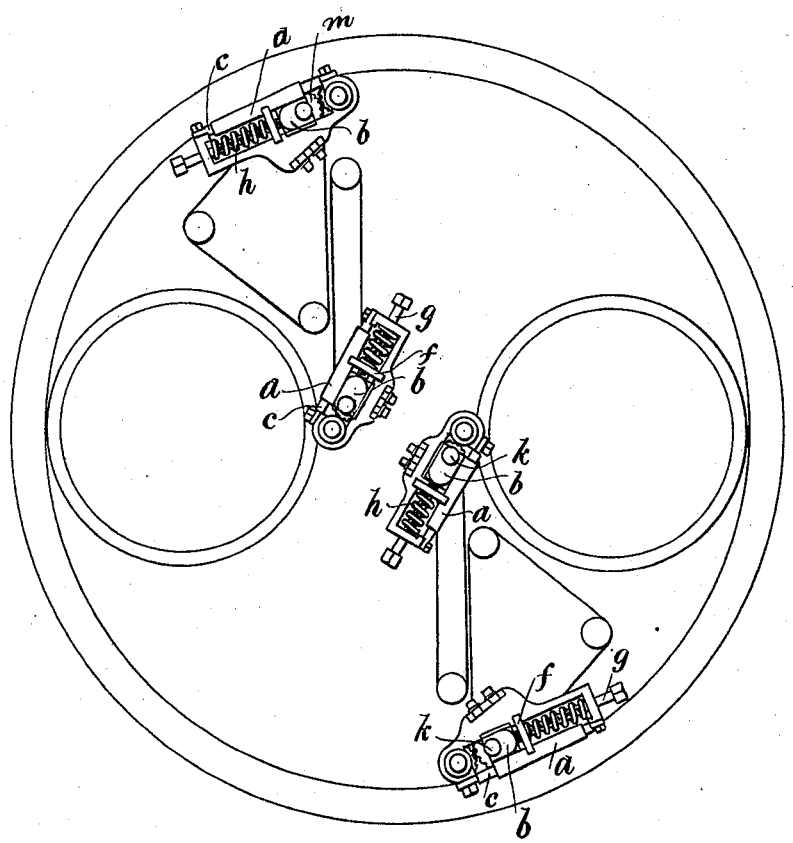

No. 617,465. Patented Jan. 10, 1899.
J. R. HOYLE & H. COLBURN.
BEARING FOR COMBING MACHINE ROLLERS.
(Application filed Mar. 5, 1898.)

(No Model.) 2 Sheets—Sheet 1.

Witnesses

Inventors
J. R. Hoyle
H. Colburn
Wright Bros & Lundy
Attorneys

No. 617,465. Patented Jan. 10, 1899.
J. R. HOYLE & H. COLBURN.
BEARING FOR COMBING MACHINE ROLLERS.
(Application filed Mar. 5, 1898.)
(No Model.) 2 Sheets—Sheet 2.
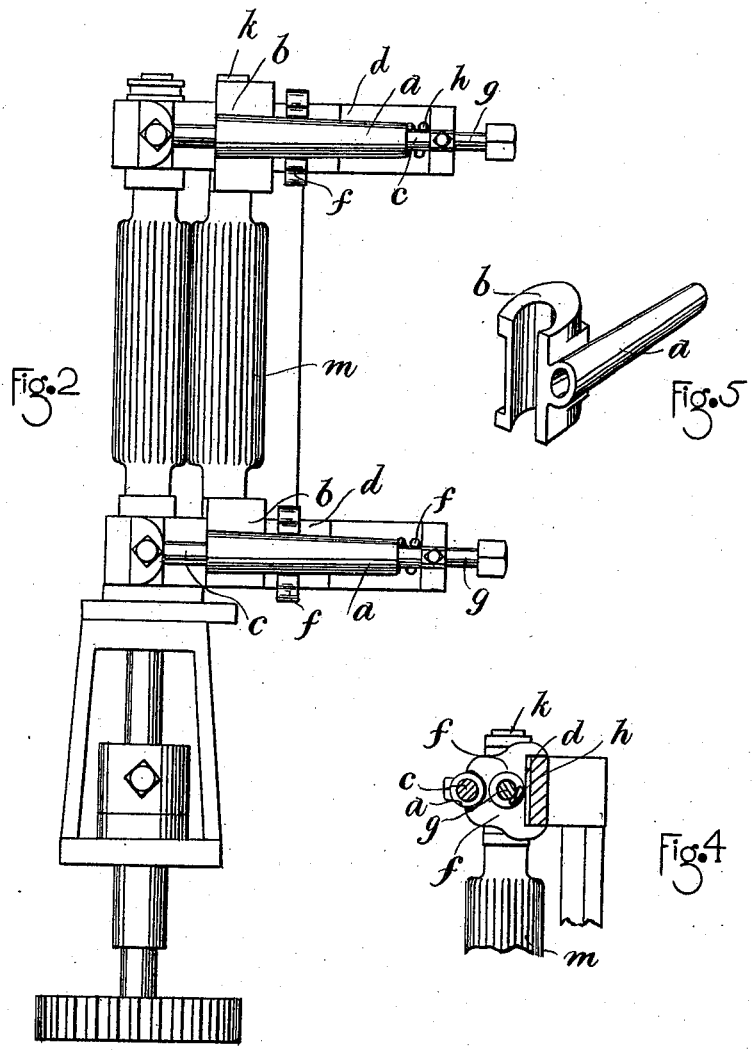
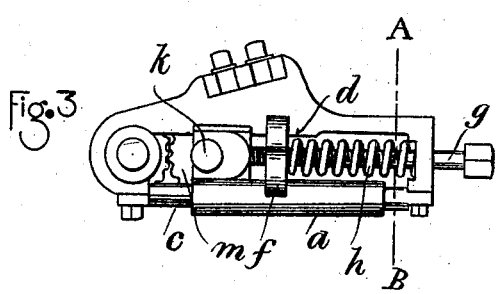
THE NORRIS PETERS CO., PHOTO-LITHO., WASHINGTON, D. C.

United States Patent Office.

JAMES RAMSDEN HOYLE AND HEBDEN COLBURN, OF KEIGHLEY, ENGLAND.

BEARING FOR COMBING-MACHINE ROLLERS.

SPECIFICATION forming part of Letters Patent No. 617,465, dated January 10, 1899.

Application filed March 5, 1898. Serial No. 672,680. (No model.)

*To all whom it may concern:*

Be it known that we, JAMES RAMSDEN HOYLE and HEBDEN COLBURN, subjects of the Queen of Great Britain, residing at Keighley, in the county of York, England, have invented an Improvement in Bearings for Combing-Machine Rollers, of which the following is a specification.

In connection with the bearings for the "drawing-off" rollers for combing-machines used in the treatment of fibrous substances a great difficulty has heretofore been experienced by the rapid deterioration of the bushes or movable bearings through or in which the rollers' shafts rotate by reason of the guiding-surfaces formed thereon being considerably limited in extent, while the rollers are at all times subjected to such vibrations, and that against the pressure of their springs, as to be very damaging to their bearings as heretofore constructed. To obviate this defect and produce bearings which shall allow all the necessary freedom for the movements of the rollers and yet be so constructed as to counteract the damaging forces they have to withstand is the object of this invention, and this object we attain by the mechanism hereinafter described, and as illustrated by the accompanying sheets of drawings, in which—

Figure 1 is a view as seen from above of the parts of a combing-machine necessary to show the application of our invention. Figs. 2 and 3 are side and end views of the rollers mounted in our improved bearings, the same drawn to an enlarged scale. Fig. 4 is a sectional view on line A B of parts shown by Fig. 3. Fig. 5 is a drawing in detail, showing a part hereinafter explained.

We attain the object of our invention by forming a sleeve $a$ on or securing it to the sliding bearing-block $b$, this sleeve being arranged to take over the guiding-rod $c$, secured to the bearings, on the one side and slide against the bearing part $d$ on the other side of it by these means, while we are enabled to employ the usual sliding block $f$, screw $g$, and spring $h$ for their well-known pressure-transmitting purposes. We so secure the block $b$ that it is firmly held against the tendency it has to revolve with the shaft $k$ of its roller $m$, and it is well known that this tendency to revolve (which tendency is greatly increased by the vibratory motions of the roller $m$, which is fluted and acts or is pressed against the other fluted roller $p$) adds greatly to the source from which deterioration is caused.

We are aware that without departing from the nature of our invention more than one of these rods $c$ may be employed and that they may be somewhat differently arranged to that shown by the accompanying drawings. However, we prefer the arrangement herein described. Therefore

What we claim as of our invention, and desire to secure by Letters Patent, is—

In bearings of the class described, the combination of a roll-journal, a bearing-frame having a guiding portion and a parallel guide-rod attached to the frame, a bearing-block embracing the roll-journal and formed to slide against said guiding portion and having an elongated guiding extension embracing the guide-rod, and adjusting means for said bearing-block comprising the sliding block $f$, screw $g$, and spring $h$ surrounding said screw and abutting the bearing-frame and block $f$.

JAMES RAMSDEN HOYLE.
HEBDEN COLBURN.

Witnesses:
SAMUEL HEY,
JOHN WHITEHEAD.